(12) United States Patent
Gaff et al.

(10) Patent No.: US 7,497,614 B2
(45) Date of Patent: Mar. 3, 2009

(54) APPARATUS FOR DETERMINING A TEMPERATURE OF A SUBSTRATE AND METHODS THEREFOR

(75) Inventors: Keith Gaff, Fremont, CA (US); Neil Martin Paul Benjamin, Austin, TX (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 11/829,833

(22) Filed: Jul. 27, 2007

(65) Prior Publication Data

US 2008/0019418 A1    Jan. 24, 2008

Related U.S. Application Data

(63) Continuation of application No. 11/233,561, filed on Sep. 22, 2005.

(51) Int. Cl.
G01K 11/00 (2006.01)
G01K 13/00 (2006.01)

(52) U.S. Cl. .................. 374/161; 374/141; 374/120

(58) Field of Classification Search .......... 374/141, 374/161, 120
See application file for complete search history.

(56) References Cited

U.S. PATENT DOCUMENTS

| 5,775,808 | A | 7/1998 | Pan |
|---|---|---|---|
| 5,876,119 | A | 3/1999 | Ishikawa et al. |
| 6,481,886 | B1 | 11/2002 | Narendrnath et al. |
| 6,572,265 | B1 | 6/2003 | Gotthold et al. |
| 6,616,332 | B1 | 9/2003 | Renken et al. |
| 6,667,527 | B2 | 12/2003 | Lue et al. |
| 7,080,940 | B2 | 7/2006 | Gotthold et al. |
| 7,255,474 | B2 | 8/2007 | Cong et al. |
| 2007/0064767 | A1 | 3/2007 | Gaff |

OTHER PUBLICATIONS

"International Search Report", date mailed Nov. 6, 2007, International Application No. PCT/US06/35620; Filed on Sep. 12, 2006; Applicants: Lam Research Corporation.
"Written Opinion", date mailed Nov. 6, 2007, International Application No. PCT/US06/35620; Filed on Sep. 12, 2006; Applicants: Lam Research Corporation.
"International Preliminary Report on Patentability", Issue in PCT Application No. PCT/US2006/035620; Mailing Date.: Apr. 3, 2008.

*Primary Examiner*—Gail Verbitsky
*Assistant Examiner*—Mirellys Jagan
(74) *Attorney, Agent, or Firm*—IP Strategy Group, P.C.

(57) ABSTRACT

An apparatus for measuring a temperature of a substrate is disclosed. The apparatus includes a phosphor material in direct contact with the substrate and in thermal contact with the substrate, the phosphor material producing a fluorescent response in a first wavelength range when exposed to a electromagnetic radiation in a second wavelength range, the fluorescent response decaying at a decay rate that is related to a temperature of the phosphor material, and the phosphor material producing a first set of non volatile byproducts when expose to a plasma.

25 Claims, 18 Drawing Sheets

APPARATUS FOR DETERMINING A TEMPERATURE OF A SUBSTRATE AND METHODS THEREFOR

RELATED APPLICATIONS

This application is a continuation application of application Ser. No. 11/233,561, filed on Sep. 22, 2005 by inventors Keith Gaff et al. This application claims the benefit of application Ser. No. 11/233,561 under 35 USC 120.

BACKGROUND OF THE INVENTION

The present invention relates in general to substrate manufacturing technologies and in particular to apparatus for determining a temperature of a substrate and methods therefor.

In the processing of a substrate, e.g., a semiconductor substrate or a glass panel such as one used in flat panel display manufacturing, plasma is often employed. As part of the processing of a substrate for example, the substrate is divided into a plurality of dies, or rectangular areas, each of which will become an integrated circuit. The substrate is then processed in a series of steps in which materials are selectively removed (etching) and deposited. Control of the transistor gate critical dimension (CD) on the order of a few nanometers is a top priority, as each nanometer deviation from the target gate length may translate directly into the operational speed of these devices.

Areas of the hardened emulsion are then selectively removed, causing components of the underlying layer to become exposed. The substrate is then placed in a plasma processing chamber on a substrate support structure comprising a mono-polar or bi-polar electrode, called a chuck or pedestal. An appropriate set of process gases are then flowed into the chamber and struck to form a plasma to etch exposed areas of the substrate.

However, with these and other plasma processes, it is often difficult to monitor the process since process conditions may be dynamic within a plasma processing system because of chamber residue build up, plasma damage to chamber structures, etc. For example, in order to enhance the uniformity of plasma processing of a substrate in a plasma processing apparatus, it is desirable to control the temperature at exposed surfaces of the substrate at which etching occurs, on which material is deposited (e.g., by a CVD or PVD technique), and/or from which photoresist is removed. If a substrate's temperature rises above a certain temperature, substrate damage (e.g., photoresist damage) can occur, and temperature-dependent chemical reactions can be altered. Substrate temperature may also significantly affect plasma selectively by changing the deposition rate of polymeric films, sub as polyfluoro-carbon, on the substrate surface. Careful monitoring may minimize variation, allow a wider process window for other parameters, and improve process control. However, in practice it may be difficult to directly determine temperature in-situ without affecting the plasma process. Hence indirect temperature measurement (ITM) devices that do not physically contact the substrate are preferred.

However, some ITM devices may not be able to sufficiently isolate a substrate temperature from thermal energy propagated by other structures (e.g., chuck, etc.) in close proximity. For example, a thermocouple may be attached to a chuck which is, in turn, in thermal contact with a substrate. The chuck, with a difference thermal mass than the substrate, may also be at a different temperature. Hence, the ITM device must generally be calibrated for a particular substrate configuration in a particular process recipe.

In contrast, other ITM devices may be able to thermally isolate the substrate, but are themselves sensitive to physical variations between substrates that will affect the measured temperature. Hence, these ITM devices also need to be calibrated. For example, an electromagnetic pyrometer may be used to measure the intensity of the substrate's emitted radiation (e.g., photoluminescence) which may be correlated to substrate temperature. In general, a substrate may absorb electromagnetic radiation of some frequency and then emit radiation at another frequency corresponding to the substrates specific structure, composition and quality.

There are generally several methods of calibration. One in particular involves comparing a first substrate temperature in-situ as measured by the ITM device, to a second temperature of the same substrate as measured by a more accurate calibration device. However, as a portion of the calibration device generally needs to physically contact the substrate, which is discouraged, since the calibration device is generally not suited for normal substrate processing. For example, prior to running a batch of a particular substrate configuration in a particular process, the ITM device is calibrated with a calibration device. Once calibration occurs, normal substrate processing begins.

Phosphor thermometry is commonly used to calibrate ITM devices. By first transmitting light (electromagnetic radiation) to the magnetic phosphor within a first wavelength range, and then measuring the rate of decay of the fluorescent response within a second wavelength range, the temperature of the phosphor, and hence the substrate on which it is placed, can be determined. Again, as the phosphor must physically contact the substrate, phosphor thermometry is generally discouraged for use with production substrates.

In general, a phosphor is a fine powder that is doped with trace elements that when excited with short wavelength light (ultraviolet or blue), emits light at a longer wavelength. Ceramic phosphors are generally preferred in plasma processing chambers because of their tolerance of extremely high temperatures. A ceramic phosphor is generally inorganic, nonmetallic, and crystalline (e.g., $Y_3A_{15}O_{12}$ (YAG) doped with Eu, Dy, or Tm, $Y_2O_3$ doped with Eu, or similar rare earth compounds).

In the case of a calibration substrate, the phosphor particles may be attached to the substrate surface, commonly the substrate side facing the chuck, and illuminated with a combination laser/sensor that is positioned in a cavity within the chuck. In general, the calibration substrate may have a special notch on the substrate surface where the phosphor particles are placed. In some configurations, the phosphor particles are directly attached to the substrate using a binder material. As with paint, a binder is a material which tends to provide a uniform consistency and solidification to the phosphor particles, and as well as cohesion with the substrate surface itself. In another configuration the phosphor particles are embedded in a patch that in turn is attached to the substrate. Normally, phosphor particles combined with a binder, or placed on a phosphor patch, are placed in a recessed position in the notch in order to prevent interference with the chucking process which secures the substrate on the chuck by electrostatic forces.

Referring now to FIG. 1, a common phosphor thermometry configuration as used in substrate manufacturing is shown. Generally, an appropriate set of gases is flowed and ionized to form a plasma 110, in order to process (e.g., etch or deposit) exposed areas of substrate 114, such as a semiconductor substrate or a glass pane, positioned on chuck 116. Substrate 114 is further configured with a phosphor material 140 as previously described. An optical fiber sensor/transmitter 142 may further be positioned such that a laser may be transmitted to phosphor material 140, and the resulting fluorescent response measured. Further coupled to sensor/transmitter 142 may be data acquisition analysis device 144 that can record the observed the fluorescent response and correlate it to an approximate substrate temperature.

Referring now to FIG. 2, a simplified diagram of a capacitively coupled plasma processing system with a phosphor thermometry is shown. Generally, capacitively coupled plasma processing systems may be configured with a single or with multiple separate RF power sources. Source RF, generated by source RF generator 134, is commonly used to generate the plasma as well as control the plasma density via capacitively coupling. Bias RF, generated by bias RF generator 138, is commonly used to control the DC bias until the ion bombardment energy. Further coupled to source RF generator 134 and bias RF generator 138 is matching network 136, which attempts to match the impedance of the RF power sources to that of plasma 110. Other forms of capacitive reactors have the RF power sources and match networks connected to the top electrode 104. In addition there are multi-anode systems such as a triode that also follow similar RF and electrode arrangements.

Generally, an appropriate set of gases is flowed through an inlet in a top electrode 104 from gas distribution system 122 into plasma chamber 102 having plasma chamber walls 117. These plasma processing gases may be subsequently ionized to form a plasma 110, in order to process (e.g., etch or deposit) exposed areas of substrate 114, such as a semiconductor substrate or a glass pane, positioned with edge ring 115 on chuck 116, which also serves as an electrode. In addition, chuck 116 may also be configured with a cavity such that optical fiber sensor/transmitter 142 may transmit a laser to phosphor material 140, and measure the resulting fluorescent response. Furthermore, vacuum system 113, including a valve 112 and a set of pumps 111, is commonly used to evacuate the ambient atmosphere from plasma chamber 102 in order to achieve the required pressure to sustain plasma 110.

In addition, some type of cooling system (not shown) is coupled to chuck 116 in order to achieve thermal equilibrium once the plasma is ignited. The cooling system itself is usually comprised of a chiller that pumps a coolant through cavities in within the chuck, and helium gas pumped between the chuck and the substrate. In addition to removing the generated heat, the helium gas also allows the cooling system to rapidly control heat dissipation. That is, increasing helium pressure subsequently also increases the heat transfer rate.

In general, the prompt fluorescence decay time τ varies as a function of temperature and may be defined by:

$$I = I_0 \exp\left[-\frac{t}{\tau}\right] \quad \text{EQUATION 1}$$

where I is the fluorescence light intensity (–), $I_0$ is the initial fluorescence light intensity (–), t is the time since cessation of excitation (s), and τ is the prompt fluorescence decay time (s). The unites of fluorescence light intensity are arbitrary. The time needed to reduce the light intensity to $e^{-1}$ (36.8%) of its original value may be defined as the prompt fluorescence decay time. (See, *Advances In High Temperature Phosphor Thermometry For Aerospace Applications*, by S. W. Allison et. al., American Institute of Aeronautics and Astronautics, p. 2).

Referring now to FIG. 3, a simplified diagram of the lifetime decay characteristics of established phosphors over a temperature range extending from 0° K to 1900° K for the main emission lines of each. (See, *Fiber Optic Temperature Sensor for PEM Fuel Cell*, by S. W. Allison, Oak Ridge National Laboratory, U.S. Department of Energy, p. 7).

Referring now to FIG. 4, a simplified diagram of a substrate in which phosphor particles are attached to a substrate surface with a binder, such a silicone adhesive. As previously described, phosphor particles may be directly attached to substrate 108 using a binder material 140a in notch 406 that is generally positioned on the substrate surface away from plasma 112. In this example, the width 402 (along the lateral axis) is 0.25 inches, while the height 404 (along the perpendicular axis) is about 0.006 inches.

Referring now to FIG. 5, a simplified diagram of a substrate with a phosphor patch. As previously described, the phosphor patch 140b may be directly attached to substrate 108 using a thermally conductive silicone adhesive 505 in notch 406 that is generally positioned on the substrate surface away from plasma 112.

Although generally shielded between substrate and the chuck, ceramic particles in a substrate notch may still be exposed and hence etched by a plasma. Free to combine with other organic and inorganic byproducts generated by the plasma process, non-volatile ceramic particles may be deposited on the interior surfaces of the plasma chamber. These byproducts may eventually flake and increase susceptibility of substrate defects, reduce the mean time between cleaning (MTBC), reduce yield, etc.

In view of the foregoing, there are desired to have an apparatus for determining a temperature of a substrate while minimizing plasma chamber contamination and methods therefore.

SUMMARY OF THE INVENTION

The invention relates, in an embodiment, to an apparatus for measuring a temperature of a substrate. The apparatus includes a phosphor material in thermal contact to the substrate, the phosphor material producing a fluorescent response in a first wavelength range when exposed to a electromagnetic radiation in a second wavelength range, the fluorescent response decaying at a decay rate that is related to a temperature of the phosphor material, and the phosphor material producing a first set of non volatile byproducts when exposed to a plasma. The apparatus also includes a barrier window positioned between the phosphor material and a plasma, wherein the barrier window allows at least a portion of the first wavelength and the second wavelength to be transmitted, and wherein the barrier window produces a second set of non volatile byproducts that is less than the first set of non volatile byproducts when exposed to the plasma, wherein when the electromagnetic radiation is transmitted to the phosphor material through the barrier window, the temperature is determined from the decay rate of the fluorescent response.

The invention relates, in an embodiment, to an apparatus of measuring a temperature of a substrate, the phosphor material producing a fluorescent response in a first wavelength range when exposed to a electromagnetic radiation in a second wavelength range, the fluorescent response decaying at a decay rate that is related to a temperature of the phosphor material, and the phosphor material producing a first set of non volatile byproducts when exposed to a plasma. The apparatus also includes means of positioning a barrier window between the phosphor material and a plasma, wherein the barrier window allows at least a portion of the first wavelength and the second wavelength to be transmitted, and wherein the barrier window produces a second set of non volatile byproducts that is less than the first set of non volatile byproducts when exposed to the plasma. The apparatus further includes means of determining the temperature from the decay rate of the fluorescent response when the electromagnetic radiation is transmitted to the phosphor material through the barrier window.

The invention relates, in an embodiment, to a method for measuring a temperature of a substrate. The method includes thermally coupling a phosphor material to the substrate, the phosphor material producing a fluorescent response in a first wavelength range when exposed to a electromagnetic radiation in a second wavelength range, the fluorescent response decaying at a decay rate that is related to a temperature of the phosphor material, and the phosphor material producing a first set of non volatile byproducts when exposed to a plasma. The method also includes positioning a barrier window between the phosphor material and a plasma, wherein the barrier window allows at least a portion of the first wavelength and the second wavelength to be transmitted, and wherein the barrier window produces a second set of non volatile byproducts that is less than the first set of non volatile byproducts when exposed to the plasma. The method further includes determining the temperature from the decay rate of the fluorescent response when the electromagnetic radiation is transmitted to the phosphor material through the barrier window.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
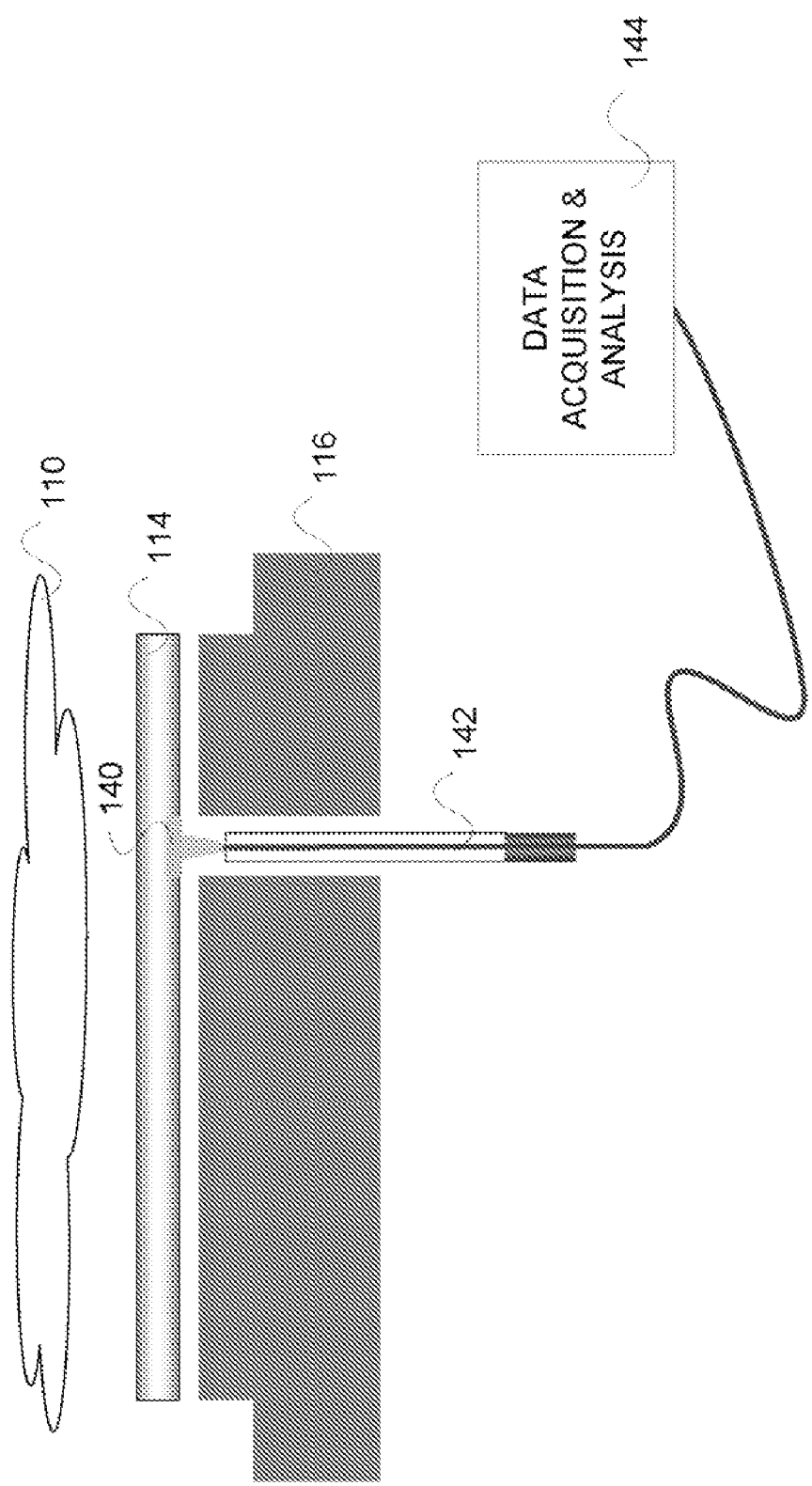
FIG. 1 illustrates a common phosphor thermometry configuration as used in substrate manufacturing.
Figure 2:
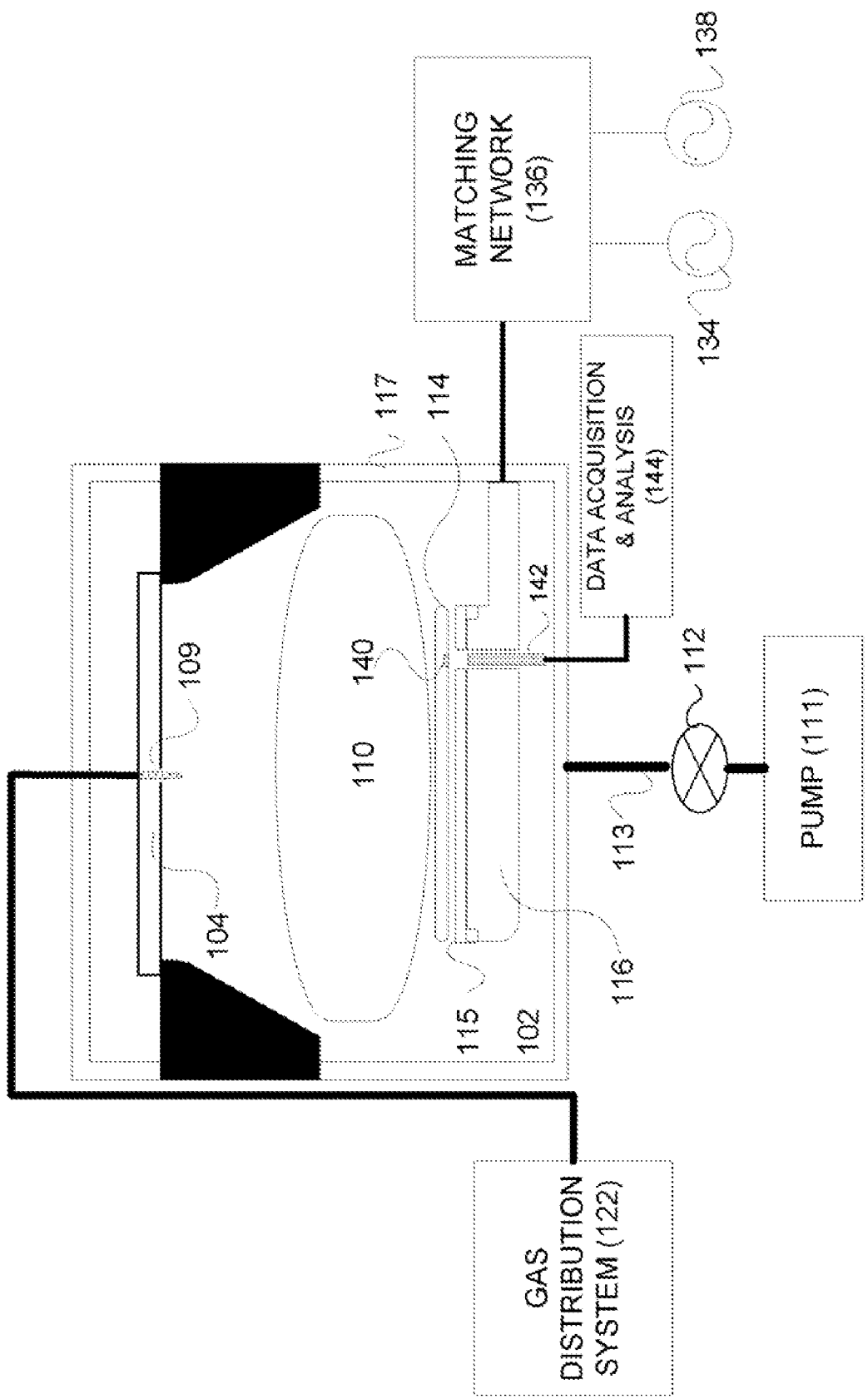
FIG. 2 illustrates a simplified diagram of a capacitively coupled plasma processing system with a phosphor thermometry.
Figure 3:
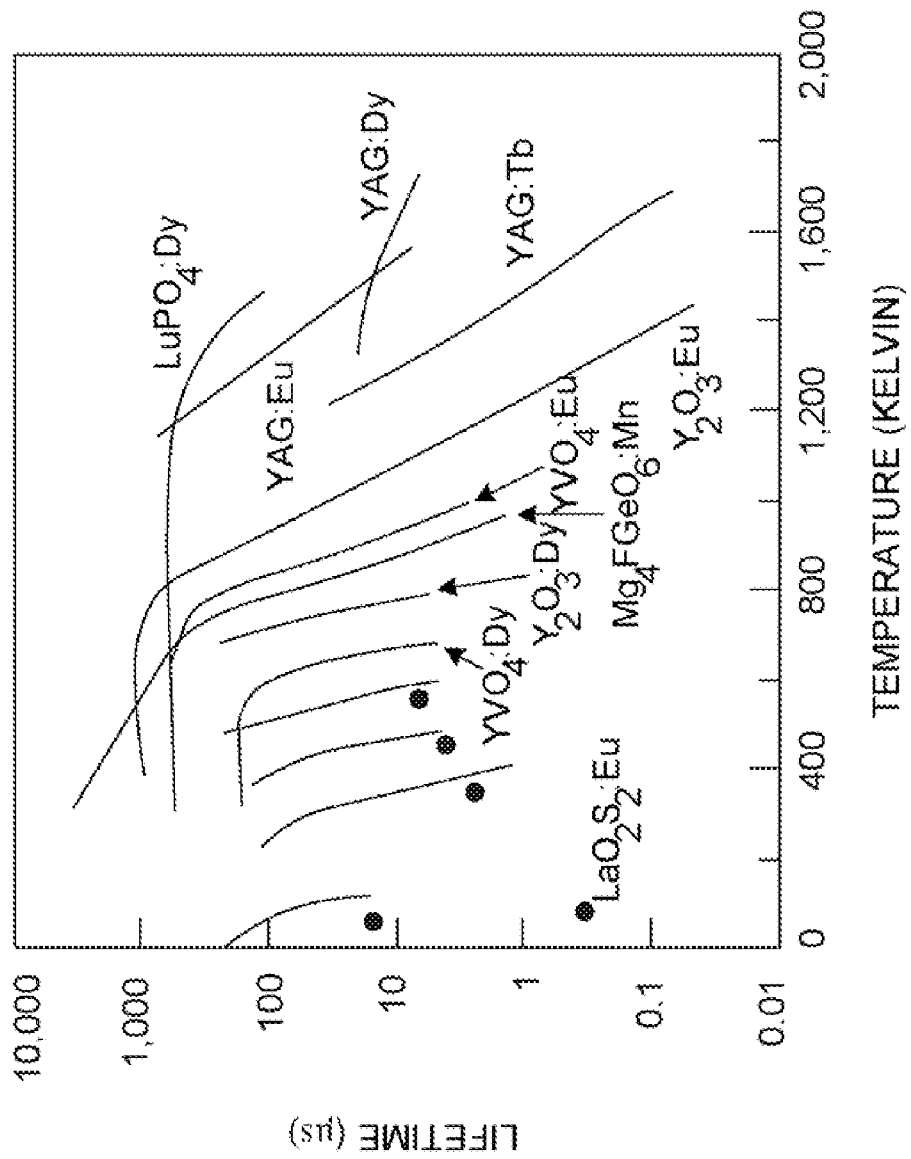
FIG. 3 illustrates a simplified diagram of the lifetime decay characteristics of established phosphors over a temperature range extending from 0° K to 1900°K for the main emission lines of each.
Figure 4:
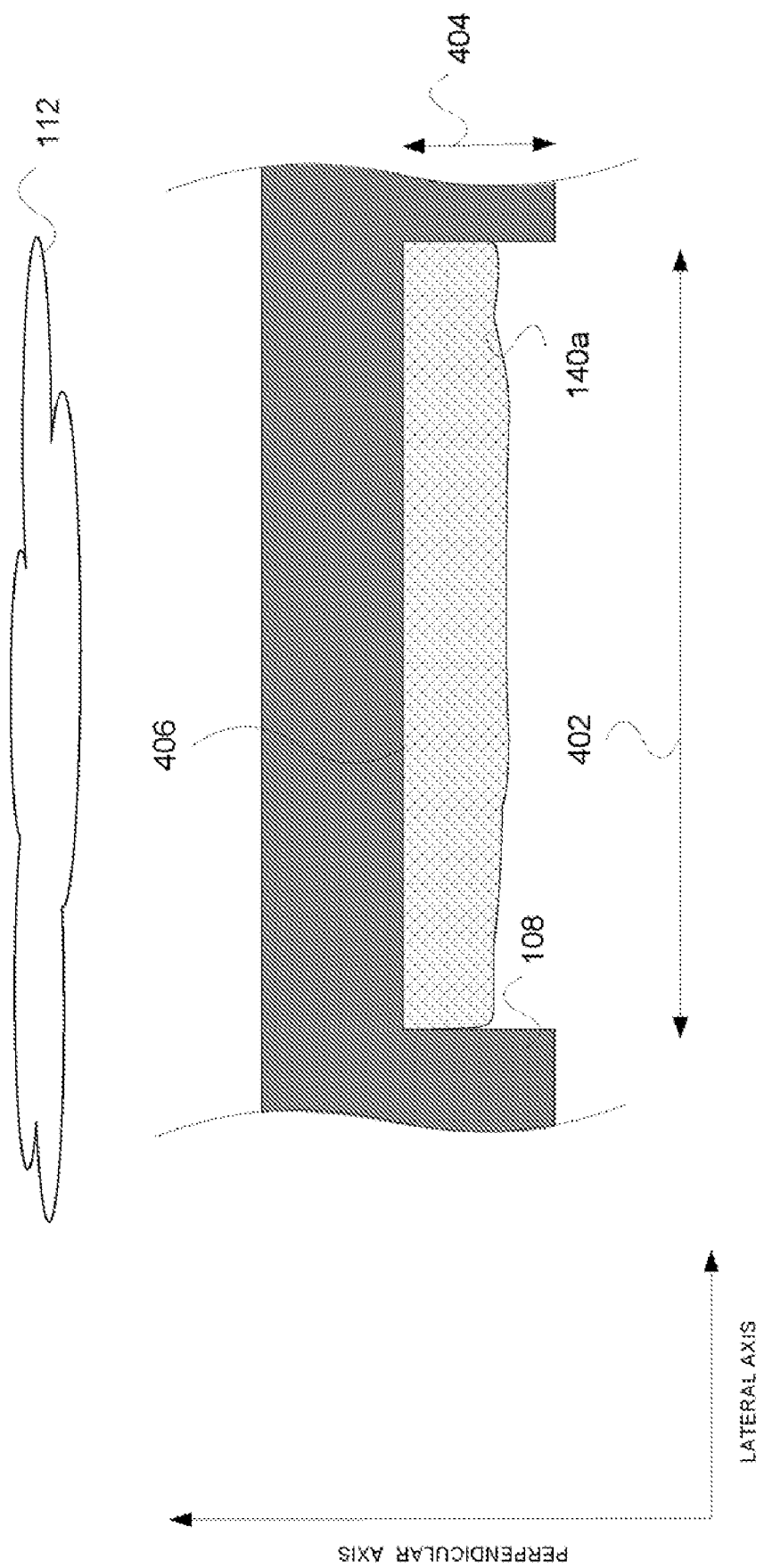
FIG. 4 illustrates a simplified diagram of a substrate in which phosphor particles are attached to a substrate surface with a binder, such a silicone adhesive.
Figure 5:
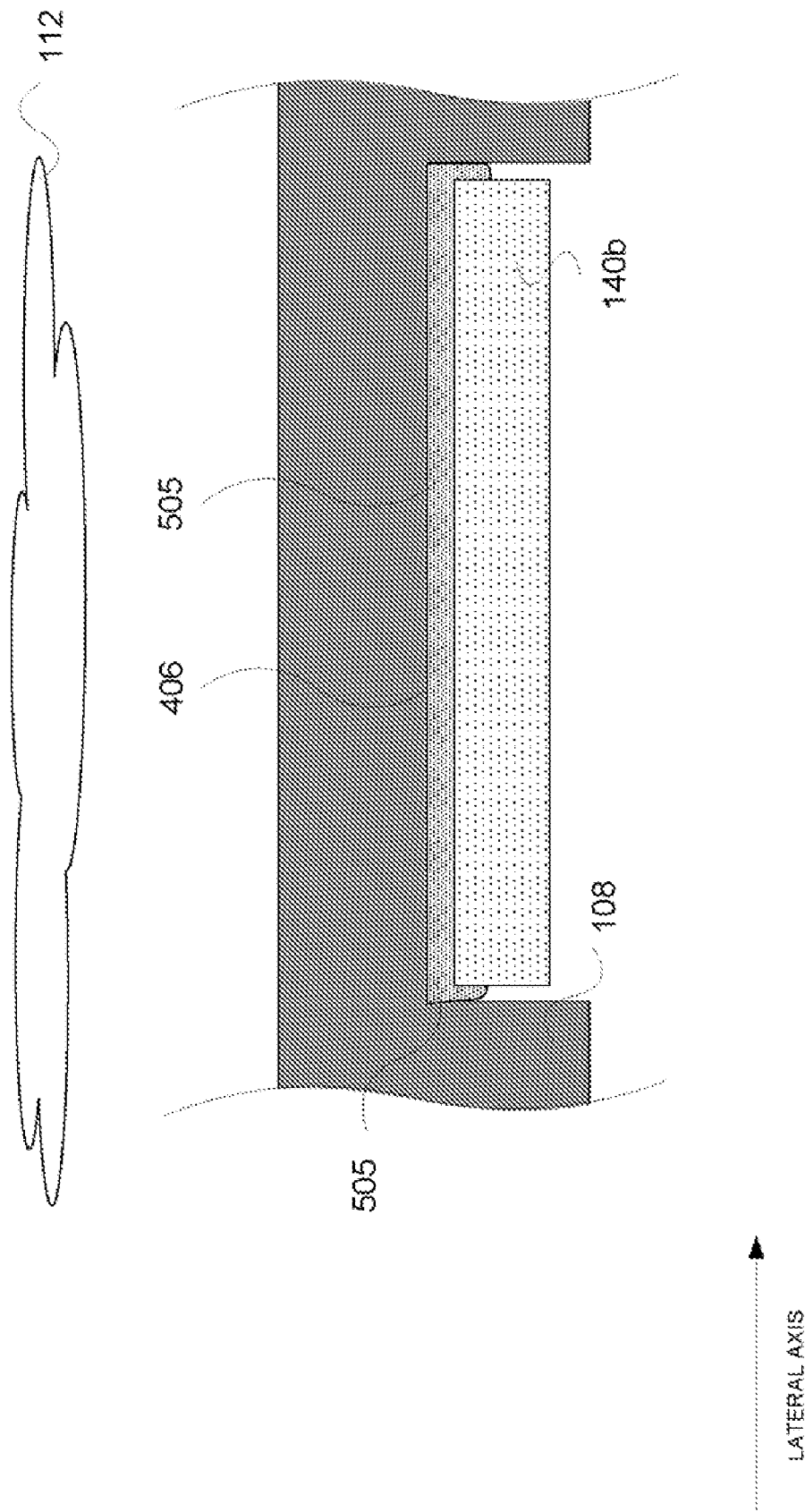
FIG. 5 illustrates a simplified diagram of a substrate with a phosphor patch.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

While not wishing to be bound by theory, the inventor believes that positioning a barrier window between ceramic phosphor particles and a plasma may allow the determination of a substrate temperature with phosphor thermometry with minimal plasma chamber contamination. In an embodiment, the barrier window comprises quartz. In an embodiment, the barrier window comprises sapphire. In an embodiment, the barrier window comprises glass. In an embodiment, the glass includes borosilicate. In an embodiment, the barrier window comprises $MgF_2$.

In a non obvious way, the addition of one more structure in the chamber, i.e., the barrier window, placed between the ceramic phosphor particles and the plasma can reduce plasma chamber contamination. It has been generally believed that there is a minimal risk of contamination caused by ceramic phosphor particles positioned between the substrate and the chuck. However, although generally shielded by the substrate mass, ceramic particles in a substrate notch may still be exposed to the plasma and hence cause non volatile byproducts. Combining with other organic and inorganic byproducts generated by the plasma process, non volatile byproducts may be deposited on interior surfaces and plasma chamber walls, resulting in a film that tends to be difficult to efficiently evacuate from the plasma chamber.

Contamination may become more pronounced as device dimensions shrink and more advanced materials are used. Examples include high-k dielectrics (HfOx, HfSixOy, etc) byproducts, metal electrode (Pt, Ir, IrOx, etc) byproducts, memory material byproducts (PtMn, NiFe, CoFe, FeW, etc), interconnect byproducts (Cu, Ru, CoWP, Ta, etc.). The resulting pollutant deposits may eventually flake and hence increase susceptibility of substrate defects, reduce the mean time between cleaning (MTBC), reduce yield, etc. For example, depending on the plasma process, conductive film deposits may form on plasma chamber interior surfaces which may impact the FW coupling of the plasma source and bias. In addition, byproduct deposits may contribute to plasma density drift.

The degree of deposit adhesion to surfaces within the chamber, and hence the subsequent degree of potential contamination, is usually dependent on the specific plasma processing recipe (e.g., chemistry, power, and temperature) and the initial surface condition of chamber process kits. In general, organic bonds tend to be very strong and adhesive (i.e., C—H, C—C, C=C, C—O, C—N, etc), since cross-linked relatively stable structures are created. These byproducts may eventually flake and increase susceptibility of substrate defects, reduce the mean time between cleaning (MTBC), reduce yield, etc. For example, depending on the plasma process, conductive film of byproducts may form on plasma chamber interior surfaces which may impact the FW coupling of the plasma source and bias.

In an embodiment, the barrier window comprises quarts ($SiO_2$). Quartz is commonly used in plasma chambers since it tends to produce volatile byproducts that can easily be removed when exposed to plasma. For example:

  EQUATION 2

  EQUATION 3

Figure 6:
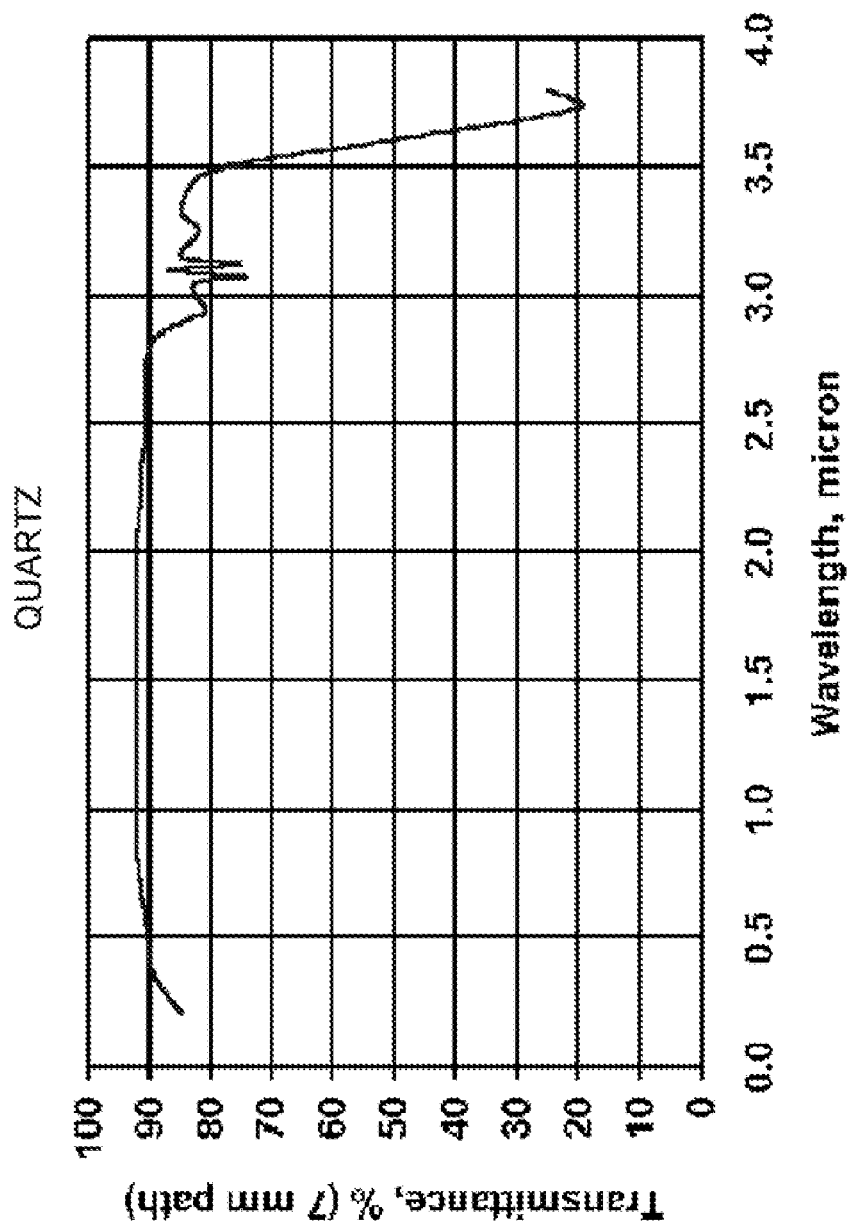
FIG. 6 illustrates a transmission graph of quartz ($SiO_2$)

Referring now to FIG. 6, a transmission graph of quarts ($SiO_2$) is shown. In general, quartz can transmit a substantial portion of light between a wavelength range about 0.25 microns to about 3.5 microns in order to illuminate a ceramic phosphor.

Figure 7:
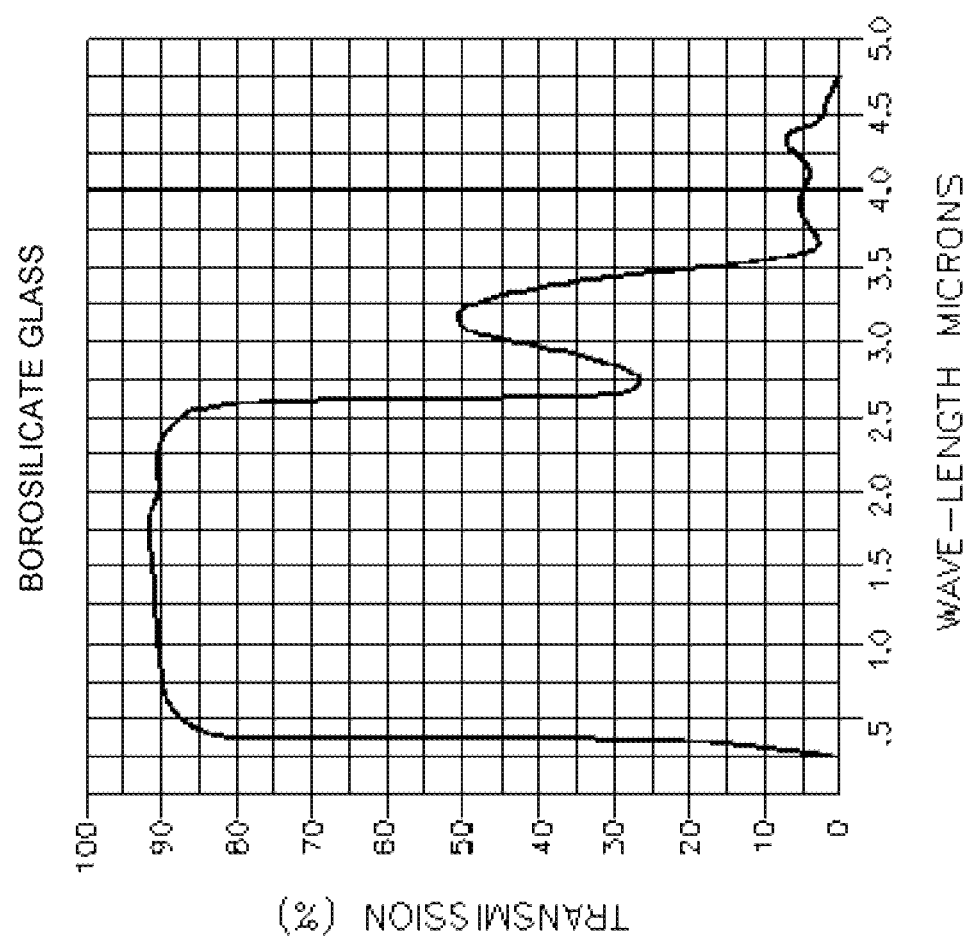
FIG. 7 illustrates a transmission graph of borosilicate glass.

Referring to FIG. 7, a transmission graph of borosilicate glass is shown. Also known as Pyrex® or Borofloat®, borosilicate glass is generally chemically inert to plasmas and hence generates almost no nonvolatile byproducts. In general, borosilicate glass can transmit a substantial portion of light between a wavelength range of about 0.5 microns to abut 2.5 microns in order to illuminate a ceramic phosphor.

Figure 8:
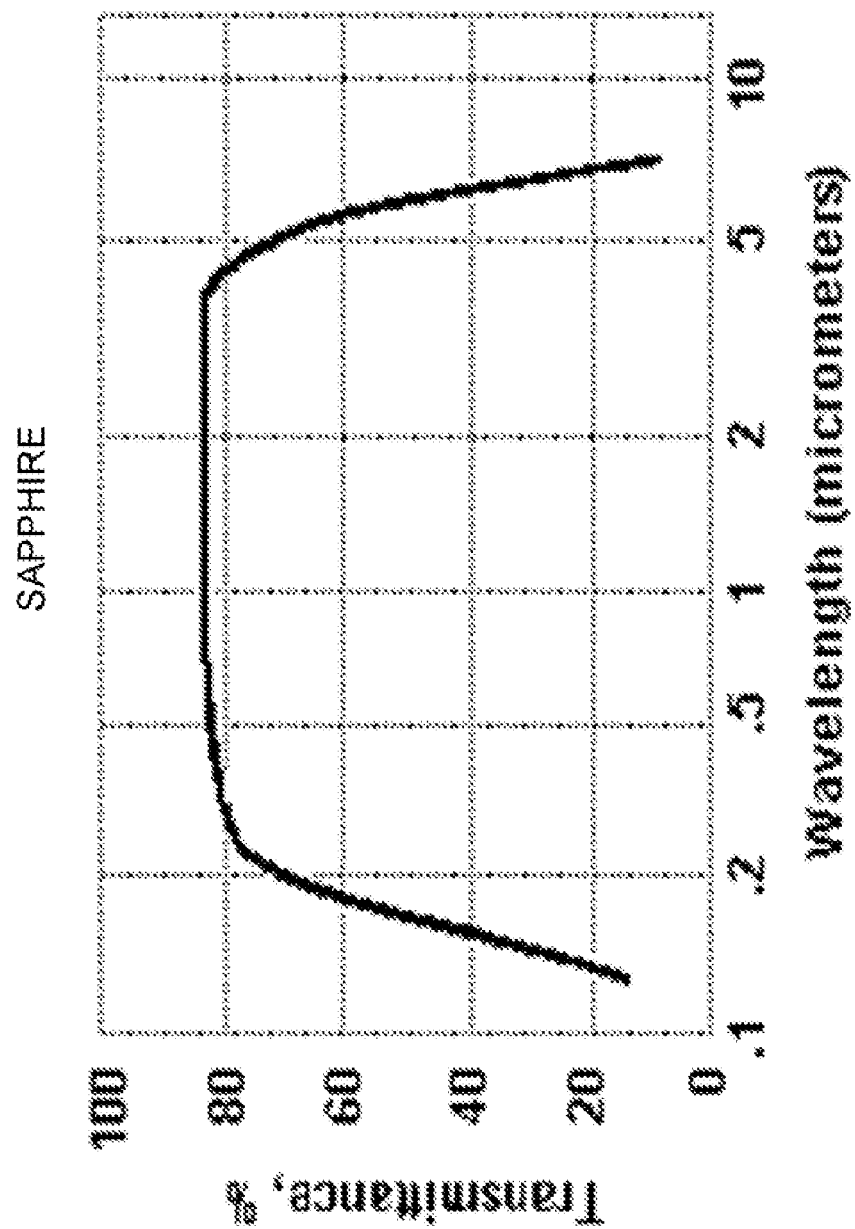
FIG. 8 illustrates a transmission graph of sapphire.

Referring now to FIG. 8, a transmission graph of sapphire is shown. Sapphire is generally chemically inert to plasmas and hence generates almost no byproducts. In general, sapphire can transmit a substantial portion of light between a wavelength range about 0.2 microns to about 5 microns in order to illuminate a ceramic phosphor.

Figure 9:
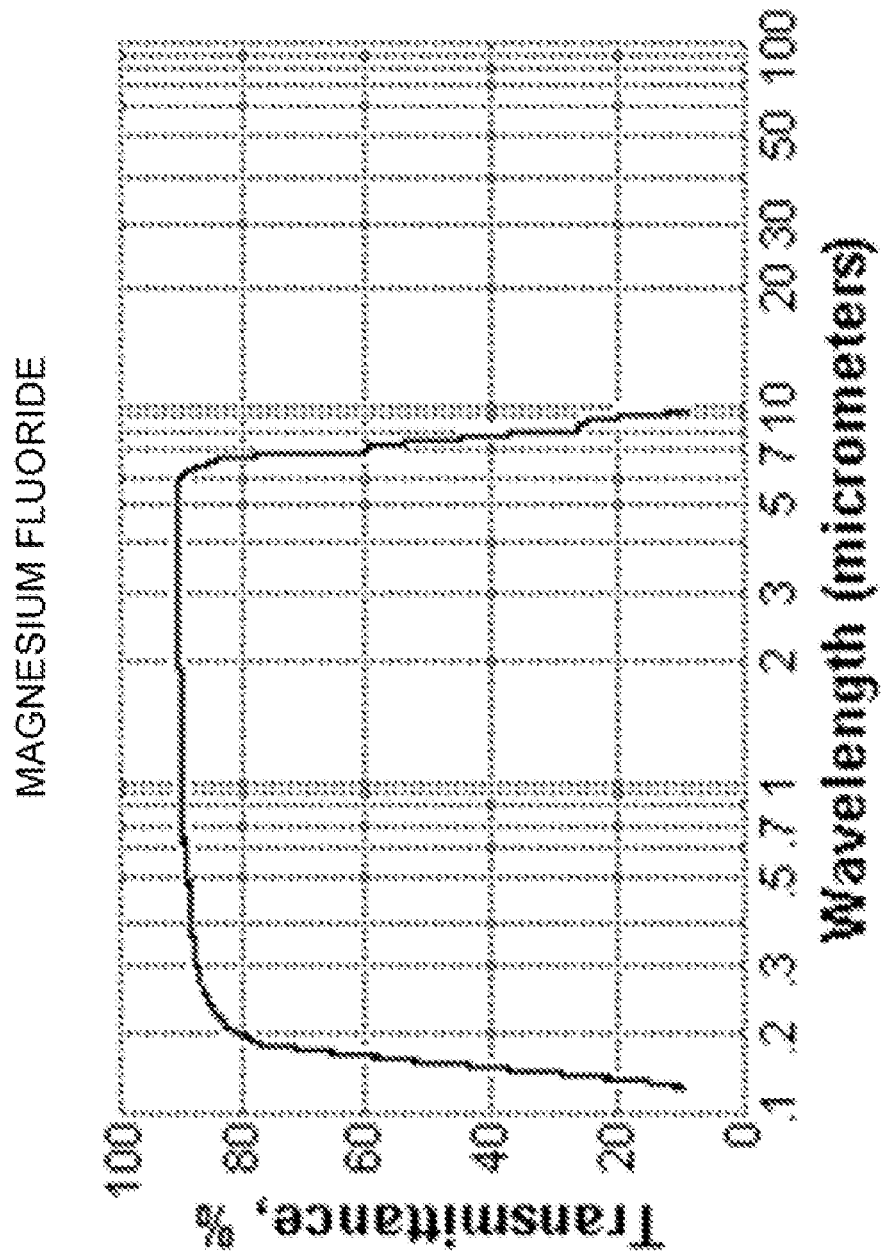
FIG. 9 illustrates a transmission graph of magnesium fluoride ($MgF_2$)

Referring now to FIG. 9, a transmission graph of magnesium fluoride ($MgF_2$) is shown. In general, $MgF_2$ can generally transmit a substantial portion of light between a wavelength range about 0.2 microns to about 5 microns in order to illuminate a ceramic phosphor. It is extremely rugged and durable when exposed to plasma, and like sapphire, produced almost no byproducts. In an embodiment, a quartz barrier window is coated with sapphire and/or $MgF_2$ on the plasma side to substantially reduce etching and hence byproduct generation.

In an embodiment, the barrier window is configured to have a low transmitted wavefront distortion. In general, transmitted wavefront distortion is evaluated by measuring the homogeneity of the refractive index of the barrier window. In an embodiment, the barrier window is configured with an anti-reflection coating in order to minimize reflection and hence improve signal strength.

Figure 10A:
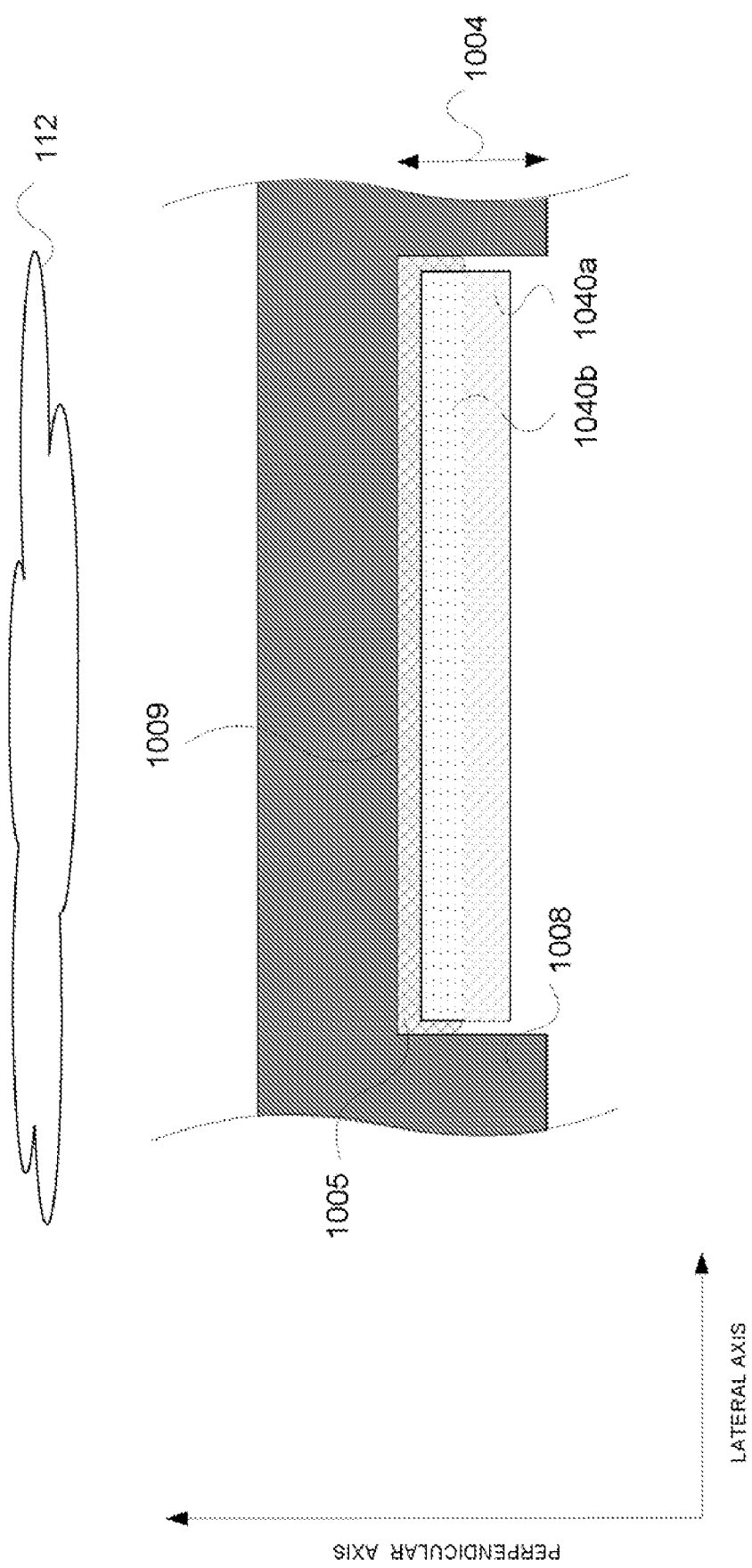
FIG. 10A illustrates a simplified diagram of a substrate in which a barrier window is secured to the substrate with an adhesive, according to an embodiment of the invention.

Referring now to FIG. 10A, a simplified diagram is shown of a substrate in which a barrier window is secured to the substrate with an adhesive according to an embodiment of the invention. As previously described, barrier window 1040*a* may comprise at least one of quartz, sapphire, glass, and $MgF_2$. In an embodiment, adhesive 1005 is a silicone adhesive. In an embodiment, phosphor particles 1040*b* may be directly attached to barrier window 1040*a* using a binder material, such as a silicone adhesive prior to bonding to the substrate. As previously described, notch 1006 is generally positioned on the substrate surface away from plasma 112. In an embodiment, barrier window 1040*a* is shaped as a lens, such that the fluorescent response may be focused. Advantages of this embodiment include the measurement of a substrate temperature with a minimal non volatile byproduct contamination, the ability to change or replace the ceramic phosphor particles if damaged, and the ability to add or replace the ceramic phosphor particles at the substrate manufacturing facility.

Figure 10B:
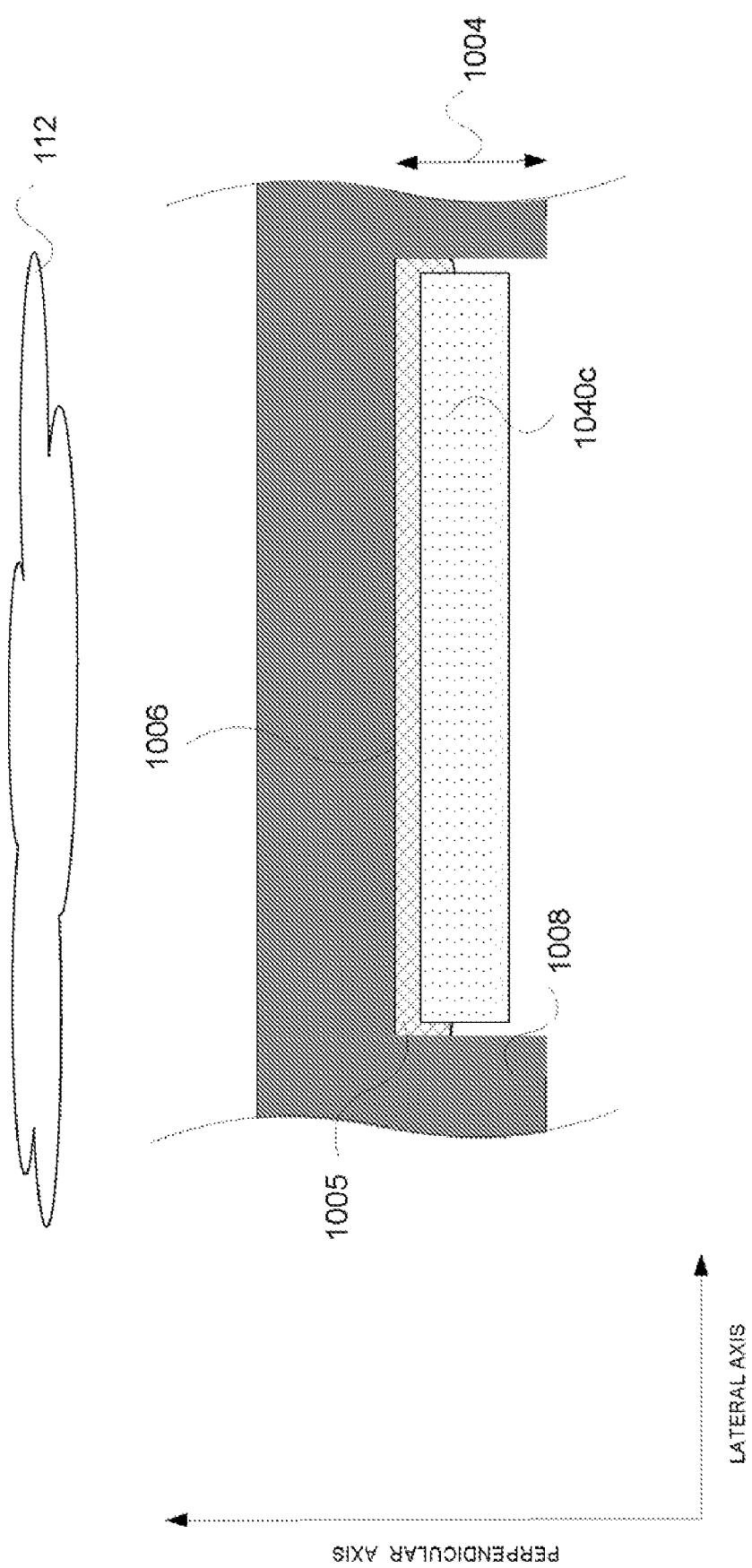
FIG. 10B illustrates a simplified diagram of a substrate in which ceramic phosphor particles have been manufactured into a barrier window that is secured to the substrate with an adhesive, according to an embodiment of the invention.

Referring now to FIG. 10B, a simplified diagram is shown of a substrate in which ceramic phosphor particles have been manufactured into a barrier window, according to an embodiment of the invention. As previously described, barrier window 1040*c* may comprise at least one of quartz, sapphire, glass, and $MgF_2$. In an embodiment, adhesive 1005 is a silicone adhesive. Notch 1006 is generally positioned on the substrate surface away from plasma 112. Advantages of this embodiment include the measurement of a substrate temperature with minimal non volatile byproduct contamination, the ability to change or replace the ceramic phosphor particles and the barrier window as a single unit if damaged, the ability to add or replace the ceramic phosphor particles and the barrier window as a single unit at the substrate manufacturing facility, and the minimization of parts inventory, as only a single part needs to be ordered per substrate, as opposed to a separate components.

Figure 11A:
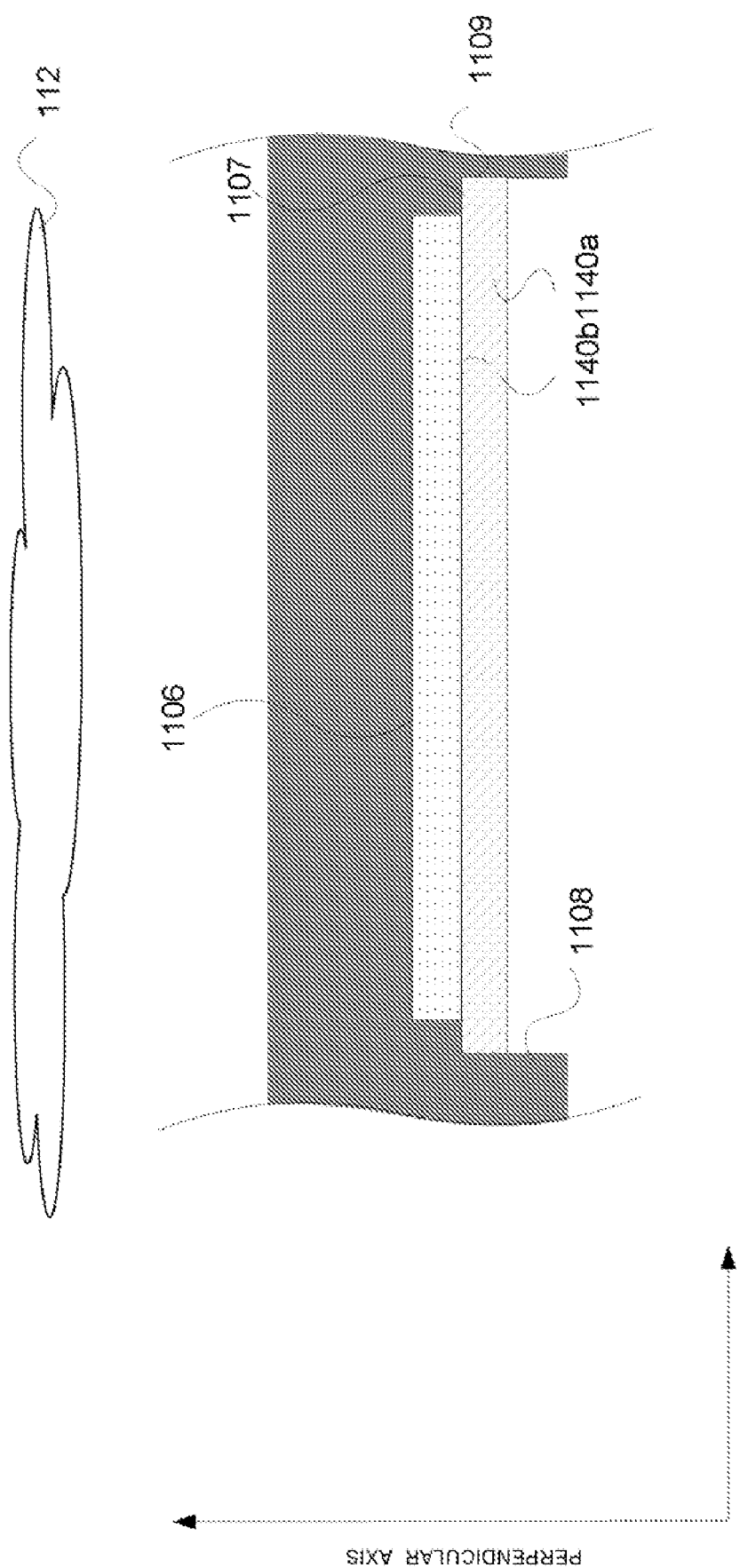
FIG. 11A illustrates a simplified diagram of a substrate in which a barrier window is secured on a substrate shelf without the need for an adhesive, according to an embodiment of the invention.

Referring now to FIG. 11A, a simplified diagram is shown of a substrate in which a barrier window is secured on a substrate shelf without the need for an adhesive, according to an embodiment of the invention. As previously described, barrier window 1140*a* may comprise at least one of quartz, sapphire, glass, and $MgF_2$. In an embodiment, barrier window is secured to substrate 1108 with an adhesive, such as a silicone adhesive. In an embodiment, barrier window 1140*a* is configured to mate with lateral mating surfaces 1107 and perpendicular mating surfaces 1109 of substrate notch 1106 with a pressure fit. In an embodiment, the barrier window is configured to mate with the lateral mating surfaces 1107 and perpendicular mating surfaces 1109 of the substrate notch with a friction fit. Friction force is generally defined as resistance across a surface area to a removal force. In an embodiment, the mating surfaces of the barrier window may impart a holding force against the corresponding mating surfaces on notch 1106, wherein the holding force is substantially greater than a friction force. Holding force is generally defined as the resistance to the parallel component of a removal force.

In an embodiment, phosphor particles 1140*b* may be directly attached to barrier window 1140*a* using a binder material, such as a silicone adhesive. As previously described, notch 1106 is generally positioned on the substrate surface away from plasma 112. Advantages of this embodiment include the measurement of a substrate temperature with minimal non volatile byproduct contamination, a two tiered notch that allows the ceramic phosphor particles to be shielded from the plasma, and improves the control of the phosphor thickness, the ability to change or replace the ceramic phosphor particles and/or barrier window if damaged, and the ability to add or replace the ceramic phosphor particles and/or barrier window at the substrate manufacturing facility.

Figure 11B:
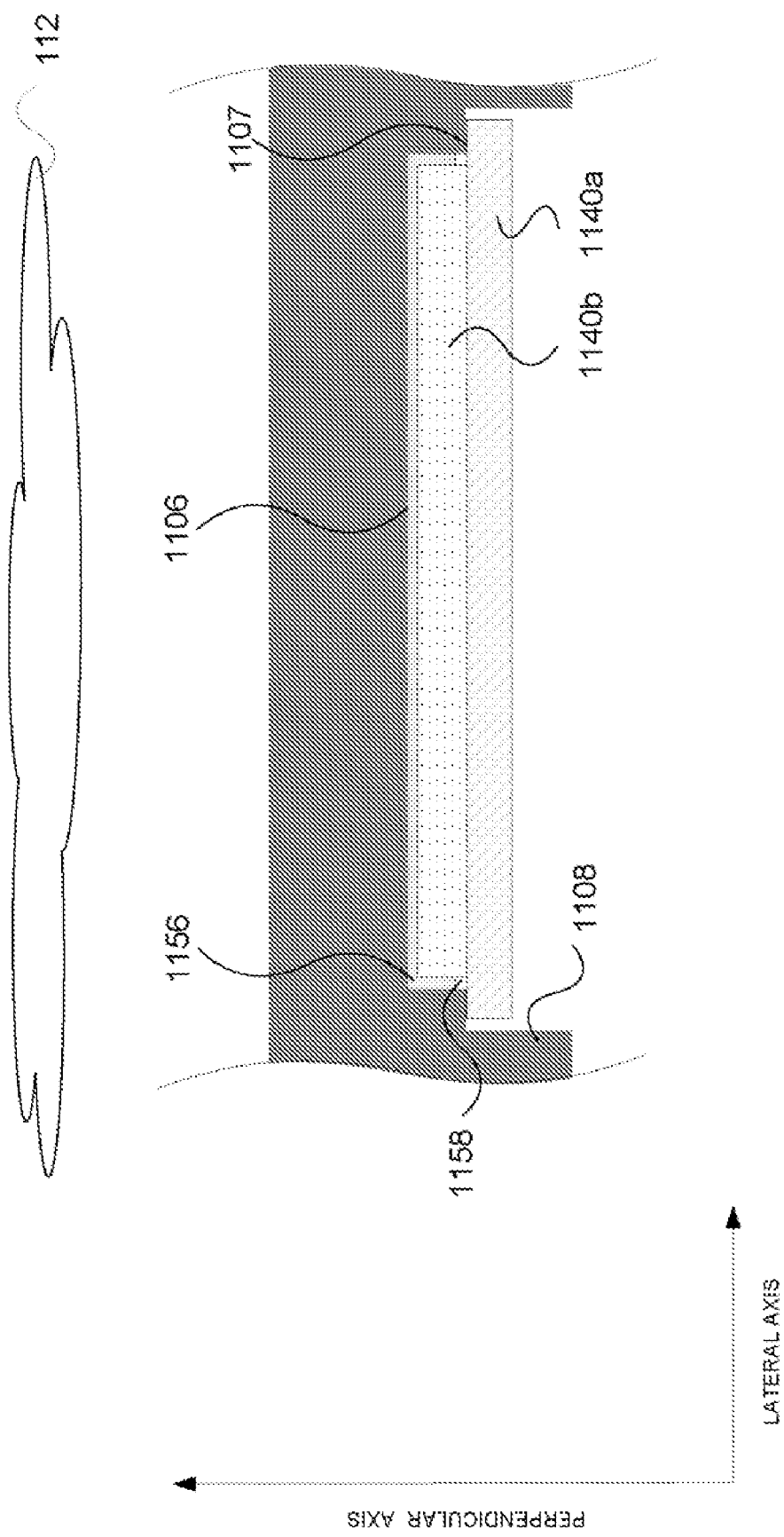
FIG. 11B shows a simplified diagram of a substrate in which a barrier window, with an attached layer of ceramic phosphor particles, is laterally and perpendicularly secured with an adhesive on a substrate shelf, according to an embodiment of the invention.

Referring now to FIG. 11B, a simplified diagram is shown of a substrate in which a barrier window, with an attached layer of ceramic phosphor particles, is laterally and perpendicularly secured with an adhesive on a substrate shelf, according to an embodiment of the invention. In general, variations in adhesive thickness between substrate 1108 and a layer of ceramic phosphor particles 1140b, among different calibration substrates, may contribute to temperature measurement variations. That is, an adhesive layer of varying thickness may consequently conduct thermal energy in varying proportions to the ceramic phosphor particles when power is applied to the calibration substrate (with plasma power on). For example, if during successive calibrations of an ITM device, first calibration substrate (with ceramic phosphor particles) is exchanged with a second calibration substrate, differing adhesive layer thicknesses between the calibration substrates may show measured temperature variations incorrectly attributed to the ITM device, and thus introducing a generally unnoticed calibration error into the plasma processing system itself. However, in an advantageous fashion, allowing a portion of barrier window 1140a to sit on shelf (lateral mating surface) 1107 creates cavity 1156 of fixed volume and thickness between the barrier window and the substrate, minimizing temperature measurement variations.

As previously described, notch 1106 is generally positioned on the substrate surface away from plasma 112. In this embodiment, adhesive 1156 may be in contact with the layer of ceramic phosphor particles 1140b along both a lateral and perpendicular axis. In an embodiment, the layer of ceramic phosphor particles 1140b may be directly attached to barrier window 1140a using a binder material, such as a silicone adhesive. In an embodiment, the binder for the phosphor material 1140b is an adhesive that shrinks upon curing thereby pulling the layer of ceramic phosphor particles, and hence barrier window 1140a, into notch 1106. Barrier window 1140a may comprise at least one of quartz, sapphire, glass, and MgF$_2$. Advantages of this embodiment include the measurement of a substrate temperature with minimal non volatile byproduct contamination, as well as the minimization of calibration errors between two or more calibration substrates.

Figure 11C:
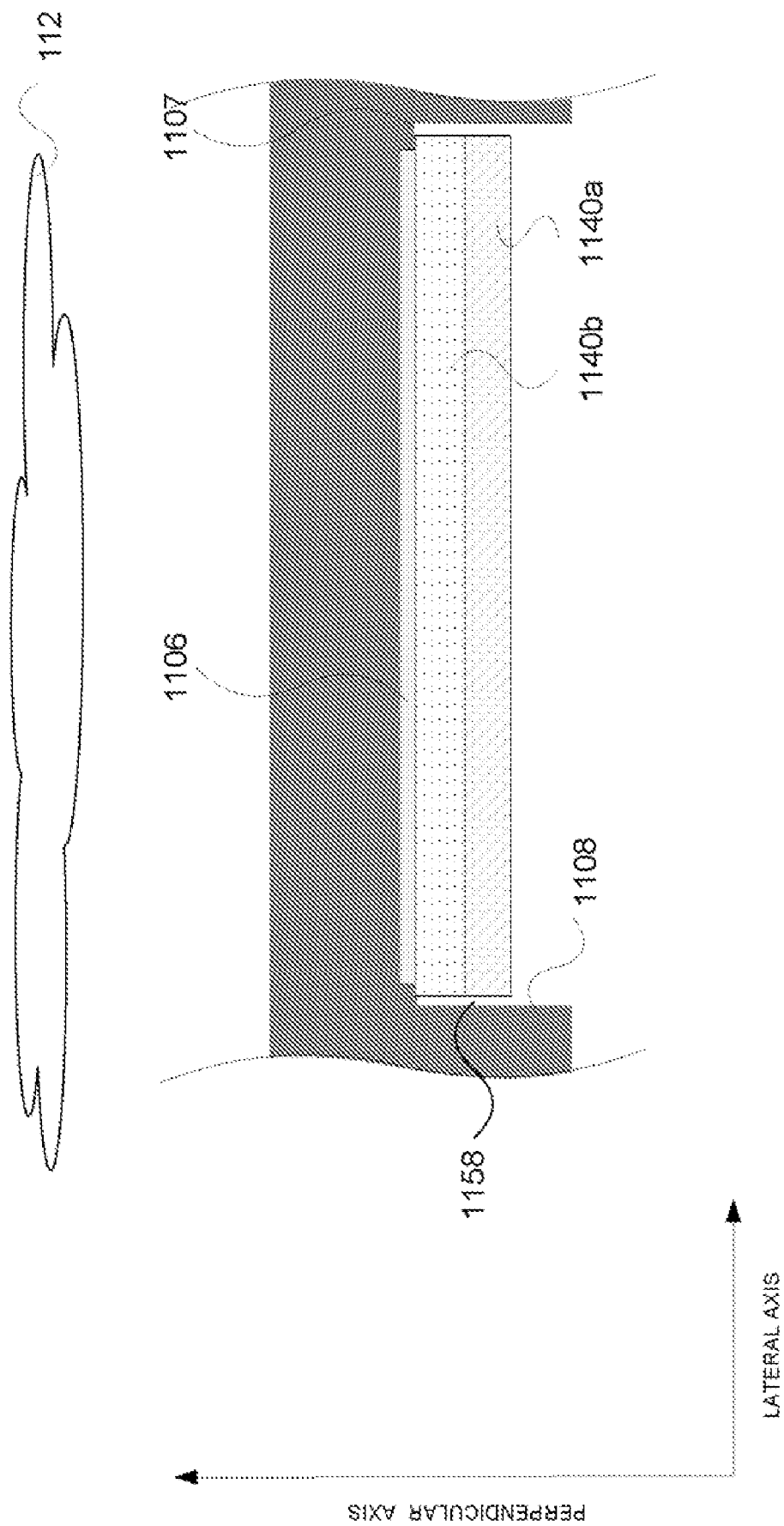
FIG. 11C shows a simplified diagram is shown of the substrate, in which a barrier window, with a layer of ceramic phosphor particles, is laterally secured with an adhesive on a substrate shelf, according to an embodiment of the invention.

Referring now to FIG. 11C, a simplified diagram is shown of a substrate in which a barrier window, with an attached layer of ceramic phosphor particles, is laterally secured with an adhesive on a substrate shelf, according to an embodiment of the invention. As previously described, notch 1106 is generally positioned on the substrate surface away from plasma 112. In this embodiment, adhesive 1156 may be in contact with the layer of ceramic phosphor particles 1140b along a lateral axis. In an embodiment, the layer of ceramic phosphor particles 1140b may be directly attached to barrier window 1140a using a binder material, such as a silicone adhesive. In an embodiment, the binder for the phosphor material 1140b is an adhesive that shrinks upon curing thereby pulling the layer of ceramic phosphor particles, and hence barrier window 1140a, into notch 1106. Advantages of this embodiment include the measurement of a substrate temperature with minimal non volatile byproduct contamination, as well as the minimization of calibration errors between two or more calibration substrates.

Figure 12:
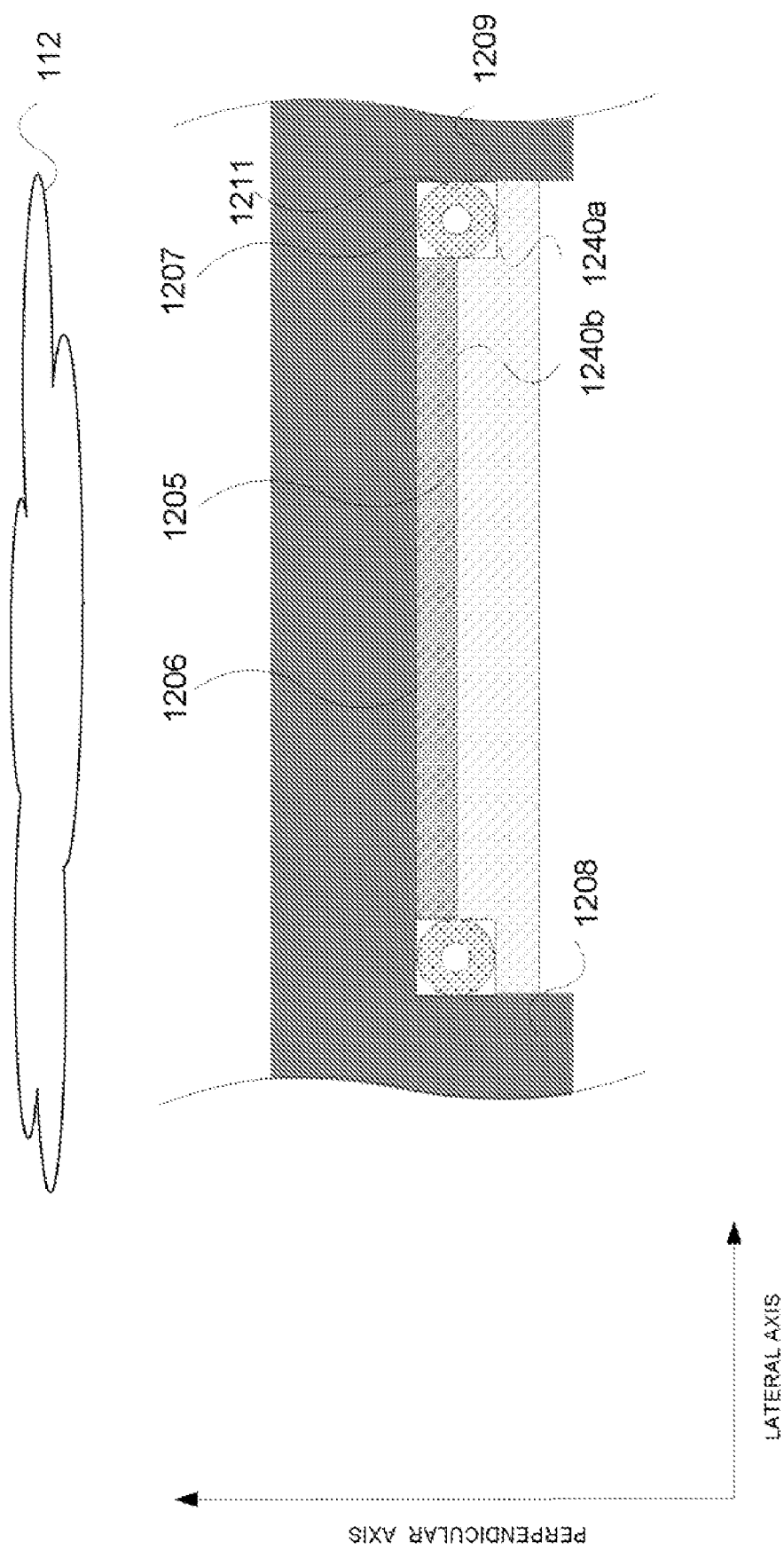
FIG. 12 illustrates a simplified diagram of a substrate in which a barrier window is secured with a set of circular gaskets, according to an embodiment of the invention.

Referring now to FIG. 12, a simplified diagram of a substrate in which a barrier window is secured with a set of circular gaskets according to an embodiment of the invention. In an embodiment, gasket 1211 is a single piece, similar to a rubber perimeter gasket on a screen door. In an embodiment, gasket 1211 is configured to male with lateral mating surfaces 1207 and/or perpendicular mating surfaces 1209 of substrate notch 1206 with a pressure fit. As previously described, barrier window 1240a may comprise at least one of quartz, sapphire, glass, and MgF2. In an embodiment, phosphor particles 1240b may be directly attached to barrier window 1240a using a binder material, such as a silicone adhesive. As previously described, notch 1206 is generally positioned on the substrate surface away from plasma 112. In an embodiment, gasket 1211 comprises rubber. In an embodiment, gasket 1211 comprises a polymide material. In an embodiment, gasket 1211 comprises rubber. In an embodiment, gasket 1211 comprises a silicon material. Advantages of this embodiment include the measurement of a substrate temperature with minimal non volatile byproduct contamination, the use of a gasket that allows the easy replacement or exchange of the ceramic phosphor particles and/or barrier window if damaged, and the ability to add or replace a ceramic phosphor particles and/or barrier window at the substrate manufacturing facility.

Figure 13:
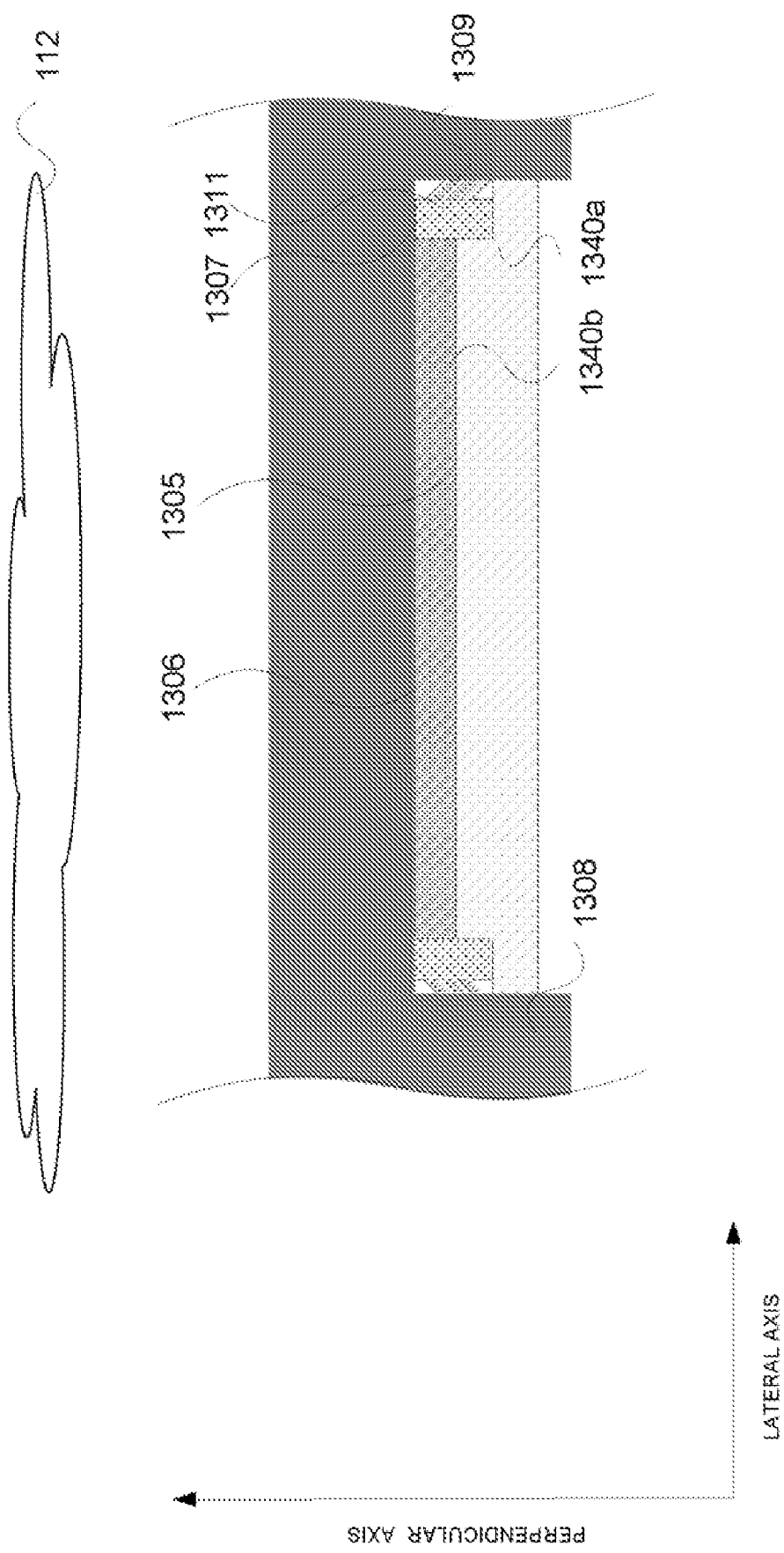
FIG. 13 illustrates a simplified diagram of a substrate in which a barrier window is secured with a set of rectangular gaskets, according to an embodiment of the invention.

Referring now to FIG. 13, a simplified diagram of a substrate in which a barrier window is secured with a set of rectangular gaskets, according to an embodiment of the invention. In an embodiment, rectangular gasket 1311 is a single piece, similar to a rubber perimeter gasket on a screen door. In an embodiment, rectangular gasket 1311 has angular protrusions that extend to perpendicular mating surfaces 1309, in order to securely attach barrier window to notch 1306. In an embodiment, rectangular gasket 1311 is configured to mate with lateral mating surfaces and/or perpendicular mating surfaces of substrate notch 1106 with a pressure fit. In an embodiment, rectangular gasket 1311 comprises rubber. In an embodiment, rectangular gasket 1311 comprises a polymide material. In an embodiment, rectangular gasket 1311 comprises rubber. In an embodiment, gasket 1311 comprises a silicon material. Advantages of this embodiment include the measurement of a substrate temperature with minimal non volatile byproduct contamination, the use of gaskets that allow the easy replacement or exchange of the ceramic phosphor particles and/or barrier window if damaged, and the ability to add or replace the ceramic phosphor particles at the substrate manufacturing facility.

Figure 14:
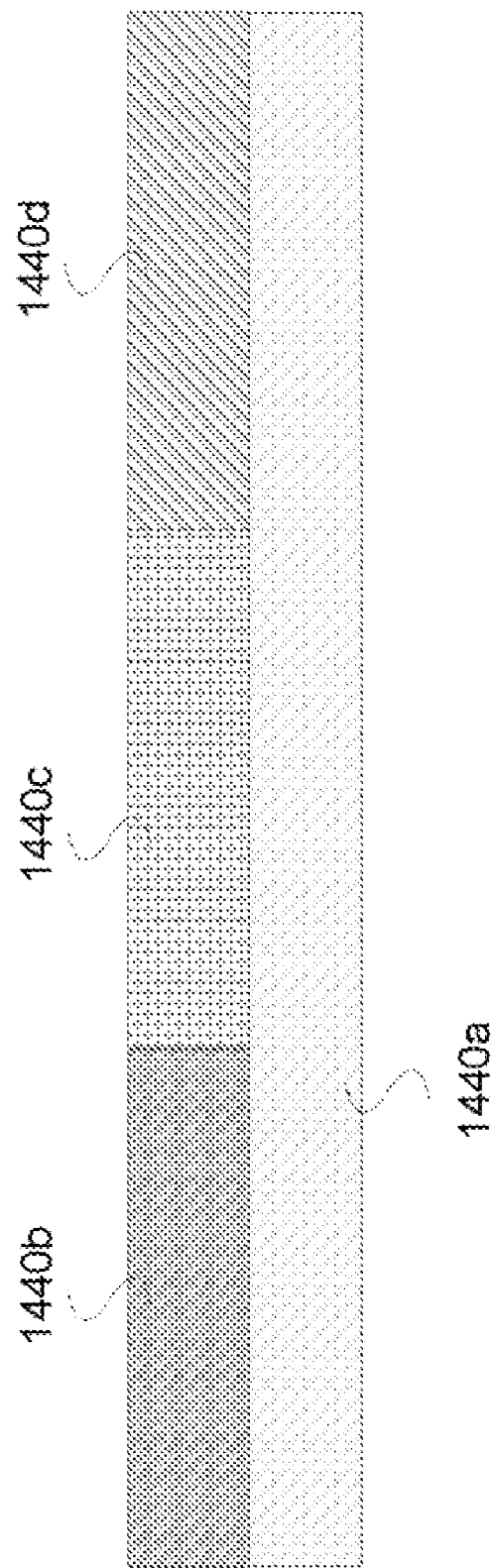
FIG. 14 illustrates a simplified diagram of a barrier window in which a set of difference ceramic phosphors is positioned, according to an embodiment of the invention.

Referring now to FIG. 14, a simplified diagram of a barrier window in which a set of difference ceramic phosphors is positioned, according to an embodiment of the invention. For example, on barrier window 1440a may be placed a first ceramic phosphor 1440b that can measure a first temperature range, a second ceramic phosphor 1440c that can measure a second temperature range, and a third ceramic phosphor 1440d that can measure a third temperature range. Advantages of this embodiment include the measurement of a substrate temperature in at least three separate temperature ranges, and the ability to change all the ceramic phosphor particles as a unit.

Figure 15:
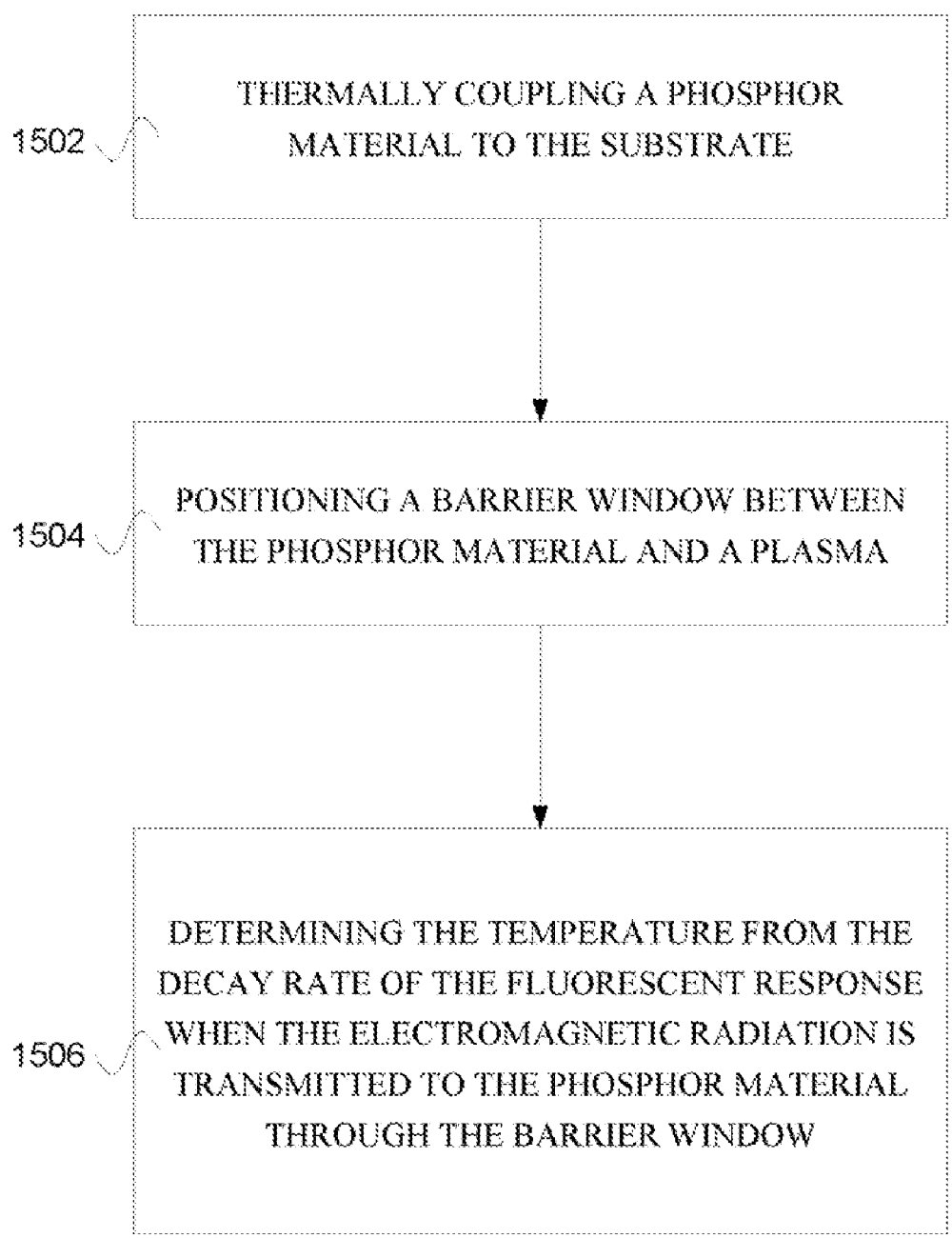
FIG. 15 illustrates a simplified method for measuring a temperature of a substrate is shown, according to an embodiment of the invention.

Referring now to FIG. 15, a simplified, method for measuring a temperature of a substrate is shown, according to an embodiment of the invention. Initially, at 1502, a phosphor material (e.g., quartz, sapphire, glass, and MgF$_2$, etc.) is coupled to the substrate, the phosphor material producing a fluorescent response in a first wavelength range when exposed to a electromagnetic radiation in a second wavelength range, the fluorescent response decaying at a decay rate that is related to a temperature of the phosphor material, and the phosphor material producing a first set of non volatile byproducts when exposed to a plasma. Next, at 1504, a barrier window is positioned between the phosphor material and a plasma, wherein the barrier window allows at least a portion of the first wavelength and the second wavelength to be transmitted, and wherein the barrier window produces a second set of non volatile byproducts that is less than the first set of non volatile byproducts when exposed to the plasma. Methods of securing the barrier window to the substrate include an adhesive, a set of gaskets, etc. Finally, at 1506, the substrate temperature is determining from the decay rate of the fluorescent response when the electromagnetic radiation is transmitted to the phosphor material through the barrier window.

While this invention has been described in terms of several preferred embodiments, there are alterations, permutations, and equivalents which fall within the scope of this invention. For example, although the present invention has been described in connection with Lam Research plasma processing systems (e.g., Exelan™, Exelan™ HP, Exelan™ HPT, 2300™, Versys™ Star, etc.), other plasma processing systems may be used. This invention may also be used with substrates of various diameters (e.g., 200 mm, 300 mm, LCD, etc.).

Advantages of the invention include the use of an apparatus for determining a temperature of a substrate and methods therefore. Additional advantages include substantially reducing ceramic phosphor particle contamination in the plasma chamber, as well as allowing the ceramic phosphor particles and/or barrier window to be changed or replaced if damaged.

Having disclosed exemplary embodiments and the best mode, modifications and variations may be made to the disclosed embodiments while remaining within the subject and spirit of the invention as defined by the following claims.

What is claimed is:

1. In a plasma processing system, an apparatus for measuring a temperature of a substrate, the apparatus comprising:
   a phosphor material in direct contact with said substrate and in thermal contact with said substrate, said phosphor material producing a fluorescent response in a first wavelength range when exposed to a electromagnetic radiation in a second wavelength range, said fluorescent response decaying at a decay rate that is related to a temperature of said phosphor material;
   a barrier window positioned between said phosphor material and a plasma, wherein said barrier window allows at least a portion of said first wavelength and said second wavelength to be transmitted; and
   a gasket configured to surround said phosphor material, wherein said phosphor material, said barrier window, and said gasket are disposed inside a notch, said notch disposed on a surface of said substrate.

2. The apparatus of claim 1, wherein said barrier window is removable for replacing said phosphor material.

3. The apparatus of claim 1, wherein said gasket is further configured to surround at least a portion of said barrier window.

4. The apparatus of claim 1, wherein a sensor/transmitter transmits a second wavelength in said second wavelength range, and said sensor/transmitter measures a first wavelength in said first wavelength range.

5. The apparatus of claim 1, wherein said barrier window is configured to secure said phosphor material in a two-tiered notch on a surface of said substrate and to shield said phosphor material from said plasma.

6. The apparatus of claim 1, wherein a sensor/transmitter is positioned in a chuck that supports said substrate.

7. The apparatus of claim 1, wherein said barrier window is secured to said substrate with one of an adhesive, a friction fit, a pressure fit, and a gasket.

8. The apparatus of claim 1 further comprising a second phosphor material, said second phosphor material positioned in said notch, said phosphor material configured for measuring a first temperature range, said second phosphor material configured for measuring a second temperature range.

9. In a plasma processing system, an apparatus of measuring a temperature of a substrate, the apparatus comprising:
   a phosphor material configured for producing a fluorescent response in a first wavelength range when exposed to a electromagnetic radiation in a second wavelength range, said fluorescent response decaying at a decay rate that is related to a temperature of said phosphor material;
   a barrier window positioned between said phosphor material and a plasma, wherein said barrier window allows at least a portion of said first wavelength and said second wavelength to be transmitted;
   means of determining said temperature from said decay rate of said fluorescent response when said electromagnetic radiation is transmitted to said phosphor material through said barrier window; and
   a gasket configured to surround said phosphor material, wherein said phosphor material, said barrier window, and said gasket are disposed inside a notch, said notch disposed on a surface of said substrate.

10. The apparatus of claim 9, wherein said barrier window is removable for replacing said phosphor material.

11. The apparatus of claim 9, wherein said gasket is further configured to surround at least a portion of said barrier window.

12. The apparatus of claim 9, wherein a sensor/transmitter transmits a second wavelength in said second wavelength range, and said sensor/transmitter measures a first wavelength in said first wavelength range.

13. The apparatus of claim 9, wherein said barrier window is configured to secure said phosphor material in a two-tiered notch on a surface of said substrate and to shield said phosphor material from said plasma.

14. The apparatus of claim 9, wherein a sensor/transmitter is positioned in a chuck that supports said substrate.

15. The apparatus of claim 9, wherein said barrier window is secured to said substrate with one of an adhesive, a friction fit, a pressure fit, and a gasket.

16. The apparatus of claim 9 further comprising a second phosphor material, said second phosphor material positioned in said notch, said phosphor material configured for measuring a first temperature range, said second phosphor material configured for measuring a second temperature range.

17. In a plasma processing system, a method for measuring a temperature of a substrate, comprising:
   thermally coupling a phosphor material to said substrate, said phosphor material producing a fluorescent response in a first wavelength range when exposed to a electromagnetic radiation in a second wavelength range, said fluorescent response decaying at a decay rate that is related to a temperature of said phosphor material;
   providing a gasket, said gasket configured to surround said phosphor material;
   positioning a barrier window between said phosphor material and a plasma, wherein said barrier window allows at least a portion of said first wavelength and said second wavelength to be transmitted;
   disposing said phosphor material, said gasket, and barrier in a notch, said notch disposed on a surface of said substrate; and determining said temperature from said decay rate of said fluorescent response when said electromagnetic radiation is transmitted to said phosphor material through said barrier window.

18. The method of claim 17, wherein said barrier window is removable for replacing said phosphor material.

19. The method of claim 17, wherein said gasket is further configured to surround at least a portion of said barrier window.

20. The method of claim 17, wherein a sensor/transmitter transmits a second wavelength in said second wavelength range, and said sensor/transmitter measures a first wavelength in said first wavelength range.

21. The method of claim 17, wherein said barrier window is configured to secure said phosphor material in a two-tiered notch on a surface of said substrate and to shield said phosphor material from said plasma.

22. The method of claim 17, wherein a sensor/transmitter is positioned in a chuck that supports said substrate.

23. The method of claim 17, wherein said barrier window is secured to said substrate with one of an adhesive, a friction fit, a pressure fit, and a gasket.

24. The method of claim 17 further comprising providing a second phosphor material, said second phosphor material in said notch, said phosphor material configured for measuring a first temperature range, said second phosphor material configured for measuring a second temperature range.

25. The method of claim 17, wherein said barrier window comprises an anti-reflection coating.

* * * * *